United States Patent [19]

Tappe et al.

[11] 4,431,585
[45] Feb. 14, 1984

[54] WATER-INSOLUBLE AZO DYESTUFFS, PROCESSES FOR THEIR MANUFACTURE AND THEIR USE FOR DYEING AND PRINTING SYNTHETIC HYDROPHOBIC FIBER MATERIAL

[75] Inventors: Horst Tappe, Dietzenbach; Ulrich Bühler, Schöneck; Kurt Roth, Hofheim; Hans-J. Weyer, Frankfurt am Main; Uwe Kosubek, Büttelborn, all of Fed. Rep. of Germany

[73] Assignee: Cassella Aktiengesellschaft, Frankfurt am Main, Fed. Rep. of Germany

[21] Appl. No.: 237,628

[22] Filed: Feb. 24, 1981

[30] Foreign Application Priority Data

Feb. 28, 1980 [DE] Fed. Rep. of Germany ....... 3007518

[51] Int. Cl.³ ...................... C09B 29/06; C09B 29/00
[52] U.S. Cl. .................................. 260/158; 260/152; 260/186; 260/207.5
[58] Field of Search .............................. 260/158, 152

[56] References Cited

U.S. PATENT DOCUMENTS

| | | | |
|---|---|---|---|
| 2,108,824 | 8/1940 | McNally et al. | 260/158 UX |
| 2,200,543 | 4/1940 | Dickey et al. | 260/158 UX |
| 2,245,259 | 5/1941 | Dickey | 260/158 UX |
| 2,311,033 | 1/1943 | Dickey | 260/158 UX |
| 2,386,599 | 10/1945 | Dickey et al. | 260/158 UX |
| 3,169,954 | 2/1965 | Straley | 260/158 UX |
| 3,329,669 | 7/1967 | Sartori | 260/158 UX |
| 3,535,306 | 10/1970 | Technau et al. | 260/158 UX |
| 3,732,201 | 5/1973 | Ramanathan | 260/158 UX |
| 4,292,239 | 9/1981 | Kruckenberg et al. | 260/158 |
| 4,301,068 | 11/1971 | Giles et al. | 260/258 X |
| 4,301,070 | 11/1981 | Giles et al. | 260/158 X |
| 4,301,071 | 11/1981 | Giles et al. | 260/158 |
| 4,302,390 | 11/1981 | Giles et al. | 260/158 |
| 4,314,817 | 2/1982 | Gertisser | 260/158 X |
| 4,327,019 | 4/1982 | Eilingsfeld et al. | 260/158 |

FOREIGN PATENT DOCUMENTS

| | | | |
|---|---|---|---|
| 93514 | 6/1966 | France | 260/158 UX |
| 1530734 | 6/1968 | France | 260/158 UX |
| 2033350 | 12/1970 | France | 260/158 UX |
| 45-5549 | of 1971 | Japan | 260/158 UX |
| 367254 | 3/1963 | Switzerland | 260/158 UX |
| 488783 | 5/1970 | Switzerland | 260/158 UX |
| 1185174 | 1971 | United Kingdom | 260/158 UX |
| 1208986 | 1971 | United Kingdom | 260/158 UX |

*Primary Examiner*—Paul F. Shaver
*Attorney, Agent, or Firm*—Connolly and Hutz

[57] ABSTRACT

Water-insoluble azo dyestuffs suitable for dyeing and printing synthetic hydrophobic fiber materials are produced by azo coupling and have the formula

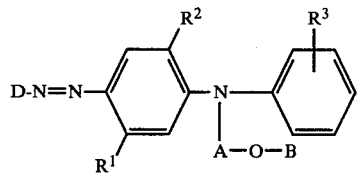

wherein
D is free from ionic moieties and is an unsubstituted or substituted phenyl, thiazole, isothiazole, benzthiazole, thiadiazole, benzisothiazole or thiophene moiety;
A is alkylene having 2 to 6 carbon atoms which is unsubstituted or substituted by —OH;
B is hydrogen, alkyl having 1 to 4 carbon atoms, hydroxyalkyl having 2 to 4 carbon atoms, alkoxyalkyl having 1 to 4 carbon atoms in the alkoxy moiety and a total of 3 to 8 carbon atoms, alkanoyloxyalkyl having 2 to 6 carbon atoms in the alkanoyl moiety and a total of 3 to 8 carbon atoms, hydroxypolyoxyalkylene having 4 to 12 carbon atoms, alkoxypolyoxyalkylene having 1 to 4 carbon atoms in the alkoxy moiety and a total of 5 to 16 carbon atoms, alkanoyloxypolyoxyalkylene having 2 to 5 carbon atoms in the alkanoyl moiety and a total of 5 to 16 carbon atoms, alkanoyl having 2 to 6 carbon atoms or benzoyl;
$R^1$ is hydrogen, methyl or chlorine;
$R^2$ is hydrogen, halogen, alkyl having 1 to 4 carbon atoms or alkoxy having 1 to 4 carbon atoms;
and $R^3$ is hydrogen or alkoxy having 1 to 8 carbon atoms.

8 Claims, No Drawings

WATER-INSOLUBLE AZO DYESTUFFS, PROCESSES FOR THEIR MANUFACTURE AND THEIR USE FOR DYEING AND PRINTING SYNTHETIC HYDROPHOBIC FIBER MATERIAL

The present invention relates to new, water-insoluble azo dyestuffs of the general formula I

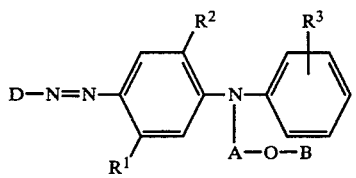

in which D denotes the radical of a diazo component of the benzene or heterocyclic series which is free from ionic groups, A denotes an alkylene chain which has 2 to 6 C atoms and which can be substituted by an OH group, B denotes hydrogen, an alkyl group having 1 to 4 C atoms, hydroxyalkyl having 2 to 4 C atoms, $C_1$ to $C_4$ alkoxyalkyl or $C_1$ to $C_4$ alkanoyloxyalkyl having 3 to 8 C atoms, hydroxypolyoxyalkylene having 4 to 12 C atoms, $C_1$ to $C_4$ alkoxypolyoxyalkylene or $C_1$ to $C_4$ alkanoyloxypolyoxyalkylene having 5 to 16 C atoms, an alkanoyl group having 2 to 6 C atoms or benzoyl, $R^1$ denotes hydrogen, methyl and chlorine, $R^2$ denotes hydrogen, halogen, alkyl having 1 to 4 C atoms and alkoxy having 1 to 4 C atoms, and $R^3$ denotes hydrogen and alkoxy having 1 to 8, preferably 1 to 4, C atoms.

The carbon containing groups for the A, B, $R^2$ and $R^3$ radicals can be straight chain or branched chain groups, as can be the carbon containing substituent groups for the phenyl or heterocyclic nucleus represented by D.

The following are examples of suitable substituents for a phenyl nucleus represented by D: halogen, particularly chlorine and bromine, cyano, nitro, trifluoromethyl, methyl, alkoxy, particularly alkoxy having 1 to 3 C atoms, carboxylic acid amide or sulphonamide, each of which is optionally N-monosubstituted or N,N-disubstituted, suitable substituents being, in particular, alkyl radicals having 1 to 4 C atoms or phenyl radicals, alkylsulphonyl, particularly alkylsulphonyl having 1 to 4 C atoms, alkylsulphonylalkyl, particularly alkylsulphonylalkyl having 2 to 8 C atoms, alkenylsulphonyl, particularly alkenylsulphonyl having 3 to 6 C atoms, alkoxysulphonyl, particularly alkoxysulphonyl having 1 to 6 C atoms, phenoxysulphonyl, aminosulphonyloxy which is N-substituted and N,N-disubstituted, suitable substituents being, in particular, alkyl radicals having 1 to 6 C atoms, $C_1$ to $C_4$ alkylsulphonyloxy, phenylsulphonyloxy and phenyl or phenylazo, it being possible for the phenyl or phenylazo radical which is a substituent of D to be substituted by halogen, particularly chlorine and bromine, cyano, nitro, trifluoromethyl, alkoxy, particularly alkoxy having 1 to 6 C atoms, alkanoyl, particularly alkanoyl having 2 to 6 C atoms, alkanoyl, particularly alkanoyloxy having 2 to 7 C atoms, benzoyl, phenoxycarbonyl, alkoxycarbonyl, particularly alkoxycarbonyl having 2 to 7 C atoms, carboxylic acid amide or sulphonamide which is optionally N-monosubstituted or N,N-disubstituted, suitable substituents being, in particular, alkyl radicals having 1 to 4 C atoms or phenyl radicals, alkylsulphonyl, particularly alkylsulphonyl having 1 to 4 C atoms, alkylsulphonylalkyl, particularly alkylsulphonylalkyl having 2 to 8 C atoms, alkenylsulphonyl, particularly alkenylsulphonyl having 3 to 6 C atoms, alkoxysulphonyl, particularly alkoxysulphonyl having 1 to 6 C atoms, phenoxysulphonyl, aminosulphonyloxy which is N-substituted and N,N-disubstituted, suitable substituents being, in particular, alkyl radicals having 1 to 6 C atoms, and $C_1$ to $C_4$ alkylsulphonyloxy and phenylsulphonyloxy.

Heterocyclic radicals, represented by D, which should be mentioned are thiazole, isothiazole, benzthiazole, thiadiazole, benzisothiazole and thiophen, which can also carry the following substituents: halogen, particularly chlorine and bromine, cyano, nitro, trifluoromethyl, alkyl, particularly alkyl having 1 to 6 C atoms, phenyl, alkoxy or alkylmercapto, particularly alkoxy or alkylmercapto having 1 to 6 C atoms, alkoxycarbonyl, particularly alkoxycarbonyl having 2 to 7 C atoms, carboxylic acid amide which is optionally N-monosubstituted or N,N-disubstituted, suitable substituents being, in particular, alkyl radicals having 1 to 4 C atoms, alkylsulphonyl and particularly alkylsulphonyl having 1 to 4 C atoms, and the phenyl radical can be substituted by halogen, particularly chlorine and bromine, cyano, nitro, trifluoromethyl, alkyl, particularly alkyl having 1 to 4 C atoms, hydroxyl, alkoxy, particularly alkoxy having 1 to 4 C atoms or alkoxycarbonyl, particularly alkoxycarbonyl having 2 to 5 C atoms.

The number and the position of the substituents of D is in accordance with the known rules for water-insoluble azo dyestuffs. Accordingly, simple substituents such as nitro, cyano, halogen and lower alkyl or lower alkoxy groups can occur several times, while substituents having a more complicated structure such as long-chain alkyl, polyoxyalkylene chains, higher alkanecarboxylic ester groups, substituted carboxamides or sulphonamides and the like preferably occur as sole substituents of D or appear together in combination with not more than one of the simple substituents mentioned previously. If a phenyl nucleus represented by D is monosubstituted, the substituents can be in the 2-, 3- or 4-position relative to the azo group. If a phenyl radical represented by D is disubstituted, for example, the rule is that these substituents are in the 2,4-position or the 2,5-position. Substitution in the 2,6-position is less usual. Preferably, however, the substituents are in the 2,4-position. If a phenyl radical represented by D is trisubstituted, the substituents are preferably located in the 2,4,6-position. They can, however, also be in the 2,4,5-position. If a phenyl nucleus represented by D is polysubstituted, it is particularly advantageous to have an electron-attracting radical, such as, for example, a cyano group and particularly a nitro group, in the 4-position relative to the azo group.

Preferred dyestuffs according to the invention are those in which D denotes a phenyl nucleus which is unsubstituted or is substituted, as required by the above comments, by up to 3 substituents belonging to the group comprising $NO_2$, F, Cl, Br, CN, —$CH_3$ or —$SO_2CH_3$, and those dyestuffs in which D denotes an optionally fused, five-membered heterocyclic radical of the thiophen, thiazole, isothiazole and thiadiazole series, which can also be substituted by F, Cl, Br, CN, $NO_2$ or $SO_2$—$CH_3$.

Alkylene chains which have 1 to 6 C atoms and can be represented by A are methylene, ethylene and trimethylene to hexamethylene. If the alkylene chains represented by A contain more than 2 carbon atoms, they can also be branched. Examples of such branched alkylene chains are 1-methylethylene, 2-methylethylene, ethylethylene, propylethylene or butylethylene, 1-methyltrimethylene, 2-methyltrimethylene, 3-methyltrimethylene, ethyltrimethylene or propyltrimethylene, 1-methyltetramethylene, 2-methyltetramethylene, 3-methyltetramethylene, 4-methyltetramethylene or ethyltetramethylene or 1-methylpentamethylene, 2-methylpentamethylene, 3-methylpentamethylene, 4-methylpentamethylene or 5-methylpentamethylene, 1,2-dimethylethylene, diethylethylene, 1-methyl-2-ethylethylene, 2-methyl-1-ethylethylene, 1,2-dimethyltrimethylene or 2,3-dimethyltrimethylene, methylethyltrimethylene groups and 1,2-dimethyltetramethylene, 1,3-dimethyltetramethylene, 1,4-dimethyltetramethylene or 2,3-dimethyltetramethylene.

Straight-chain or branched alkyl groups which have 1 to 4 carbon atoms and are represented by B are methyl, ethyl, prop-1-yl, prop-2-yl, but-1-yl, but-2-yl, 2-methylprop-1-yl or 2-methylprop-2-yl; examples of hydroxyalkyl groups which have 2 to 4 carbon atoms and can be represented by B are 2-hydroxyethyl, 2-hydroxyprop-1-yl, 1-hydroxyprop-2-yl, 2-hydroxyprop-1-yl, 1-hydroxybut-2-yl or 3-hydroxybut-2-yl. Hydroxypolyoxyalkylene groups which have 4 to 12 carbon atoms and are represented by B correspond to the general formula IVa

wherein $R^4$ and $R^5$ denote hydrogen, methyl or ethyl, with the proviso that $R^4$ and $R^5$ together do not have more than 2 C atoms, and p denotes a number from 2 to $$\frac{12}{S+2}.$$

S is the sum of the C atoms present in $R^4$ and $R^5$.

Preferred hydroxypolyoxyalkylene groups are those in which at least one of $R^4$ and $R^5$ denotes hydrogen and the other denotes methyl, and particularly those in which the two symbols $R^4$ and $R^5$ represent hydrogen.

$C_1$ to $C_4$ Alkoxypolyoxyalkylene radicals or $C_1$ to $C_4$ alkanoyloxypolyoxyalkylene radicals which are represented by B are derived from the hydroxypolyoxyalkylene radicals of the formula IVa by etherifying or acylating the terminal OH group. These radicals thus correspond to the formulae IVb and IVc

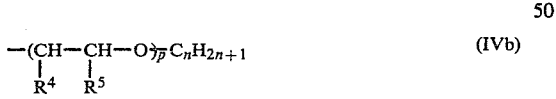

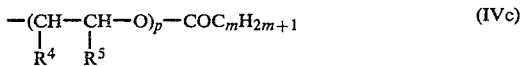

wherein $R^4$, $R^5$ and p have the same meanings as in formula IV and n is a number from 1 to 4 and m is a number from 0 to 3.

The $C_nH_{2n+1}$ alkyl groups present in the radicals of the formula IVb can be methyl, ethyl, prop-1-yl, prop-2-yl, but-1-yl, but-2-yl, methylprop-1-yl or methylprop-2-yl. Examples of acyl radicals of the formula $COC_mH_{2m+1}$ which are present in the radicals of the formula IVc are formyl, acetyl, propionyl and butyryl.

The etherification or acylation of the terminal OH groups produces a reduction in the hydrophilic character of the dyestuffs according to the invention and can thus exert a favourable effect on technical properties in use, associated therewith, such as, for example, the affinity on hydrophobic fibres or the resistance against hydrolytic influences.

Alkanoyl groups which have 2 to 6 C atoms and can be represented by B are acetyl, propionyl, butyryl, valeryl and caproyl, acetyl and propionyl being preferred.

Dyestuffs, according to the invention, of the formula I which are particularly preferred are those in which -AOB is the β-hydroxyethyl group.

Alkyl which has 1 to 4 C atoms and is represented by $R^2$ is methyl, ethyl, prop-1-yl, prop-2-yl, but-1-yl, but-2-yl, methylprop-1-yl or methylprop-2-yl.

Alkoxy which has 1 to 4 C atoms and is represented by $R^2$ is methoxy, ethoxy, prop-1-oxy, prop-2-oxy, but-1-oxy, but-2-oxy, methylprop-1-oxy or methylprop-2-oxy.

Alkoxy groups which have 1 to 8 C atoms and are represented by $R^3$ can be linear or, if they have more than 3 C atoms, can also be branched.

Examples of such alkoxy groups are methoxy, ethoxy, prop-1-oxy, prop-2-oxy, n-but-1-oxy, n-but-2-oxy, 2-methylprop-2-oxy, tert.-butoxy, pent-1-oxy, pent-3-oxy, n-hexoxy, isohexoxy, n-octyl-1-oxy or 2-ethylhex-1-oxy.

Hydrogen and methyl are preferred for $R^1$ and hydrogen, methyl and methoxy are preferred for $R^2$.

$R^3$ preferably represents hydrogen or alkoxy having 1 to 4 C atoms.

Dyestuffs according to the invention which are particularly preferred are those which have several preferred characteristics, such as, for example, those in which $R^1$, $R^2$ and $R^3$ are hydrogen.

The dyestuffs according to the invention are obtained by diazotising an aromatic amine which is free from ionic groups and has the general formula VII

and coupling the product with a diphenylamine derivative of the general formula VIII

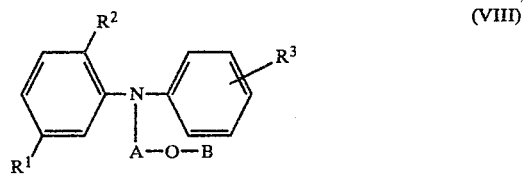

wherein A, B, $R^1$, $R^2$ and $R^3$ have the meanings indicated above.

The diazotisation of the amine of the formula VII is effected in a manner which is in itself known by treatment with nitrous acid or compounds which split off nitrous acid. For example, the aminoazobenzenes can be dissolved in sulphuric acid, hydrochloric acid or lower aliphatic carboxylic acids, such as, for example, acetic acid or propionic acid, and can be diazotised at 0° to 60° C. by adding nitrosylsulphuric acid or sodium nitrite. The coupling is carried out in an acid aqueous medium or in a mixture of water and an alcohol sparingly soluble in water, such as n-butanol or i-butanol, at temperatures from 0° to 30° C. The temperature range from 0° to 5° C. is preferred in this connection. In order to complete the coupling reaction it can be appropriate to buffer the pH value of the coupling batch at a figure from 3 to 6 towards the end of the reaction, by adding alkalis, such as, for example, sodium acetate. In regard to the conditioning of the disperse dyestuffs or in regard to their tinctorial strength, it can be advantageous to couple a mixture of diazotised amines of the formula VII with a coupling component of the formula VIII or to couple a diazotised amine of the formula VII with a mixture of coupling components of the general formula VIII or to mix two or more individual dyestuffs which have been prepared by separate routes.

The following are examples of suitable amines of the formula VII: aniline, 2-, 3- or 4-aminotoluene, 2-, 3- or 4-aminobenzyldimethylamine, 4-aminophenethyl-$\beta$-dimethylamine, 4-aminobenzyl-N-piperidine, 2-, 3- or 4-aminotrifluoromethylbenzene, 3-amino-1,2-dimethylbenzene, 4-amino-1,2-dimethylbenzene, 4-amino-n-butylbenzene, 4-amino-n-hexylbenzene, 2-, 4- or 5-amino-1,3-dimethylbenzene, 4-amino-1,3,5-trimethylbenzene, 2-, 3- or 4-aminoanisole, 2-, 3- or 4-aminophenetole, 2-, 3- or 4-amino-n-butoxybenzene, 2-amino-1,4-dimethoxybenzene, 2-amino-1,4-diethoxybenzene, 2-amino-1,4-diisopropoxybenzene, 2-, 3- or 4-fluoroaniline, 2-, 3- or 4-chloroaniline, 2-, 3- or 4-bromoaniline, 2,3-, 2,4-, 2,5- or 3,4-dichloroaniline, 2,5-dibromoaniline, 2-, 3- or 4-aminodimethylaminobenzene, 2-, 3- or 4-aminodiethylaminobenzene, 2,4,5-, 2,4,6-, 3,4,5- or 3,4,6-trichloroaniline, 3-, 4-, 5- or 6-chloro-2-aminotoluene, 4-chloro-3-aminotoluene, 2-chloro-4-aminotoluene, 5-chloro-2-aminotrifluoromethylbenzene, 4,5-dichloro-2-aminotoluene, 4,6-dichloro-2-aminotoluene, 2,5-dichloro-3-aminotoluene, 4,6-dichloro-3-aminotoluene, 2,5-dichloro-4-aminotoluene, 3,5-dichloro-4-aminotoluene, 4,5,6-trichloro-2-aminotoluene, 4-chloro-2-amino-1,3-dimethylbenzene, 2-, 3- or 4-aminobenzyl methyl sulphone, 4-aminophenylpropyl methyl sulphone, 6-chloro-3-aminoanisole, 2-chloro-4-aminoanisole, 2-chloro-4-amino-n-hexoxybenzene, 3-chloro-4-aminoanisole, 2-, 3- or 4-nitroaniline, 2-nitro-4-aminotoluene, 3-nitro-4-aminotoluene, 4-nitro-2-aminotoluene, 2-ethyl-4-nitroaniline, 5-nitro-2-aminotoluene, 5-nitro-4-amino-1,3-dimethylbenzene, 6-nitro-3-aminoanisole, 3-nitro-4-aminoanisole, 3-nitro-4-amino-n-butoxybenzene, 5-nitro-2-aminophenetole, 2-nitro-4-aminophenetole, 3-nitro-4-aminophenetole, 5-nitro-2-amino-1,4-dimethoxybenzene, 5-nitro-2-amino-1,4-diethoxybenzene, 2-chloro-4-nitroaniline, 2-bromo-4-nitroaniline, 4-chloro-2-nitroaniline, 4-bromo-2-nitroaniline, 4,6-dichloro-2-nitroaniline, 2,6-dichloro-4-nitroaniline, 2-chloro-6-bromo-4-nitroaniline, 2,6-dibromo-4-nitroaniline, 2,4-dinitroaniline, 6-chloro-2,4-dinitroaniline, 6-bromo-2,4-dinitroaniline, 2,4,6-trinitroaniline, 2-, 3- or 4-aminobenzonitrile, 1-amino-2-cyano-5-chlorobenzene, 2-cyano-4-nitroaniline, 2-cyano-6-bromo-4-nitroaniline, 4-cyano-2-nitroaniline, 1-amino-2,4-dicyanobenzene, 1-amino-2,6-dicyano-4-nitrobenzene, 1-amino-2-chloro-4-methylsulphonylbenzene, 2-methylsulphonyl-4-nitroaniline, 2-iso-butylsulphonyl-4-nitroaniline, 4-methylsulphonyl-2-nitroaniline, 4-allylsulphonyl-2-nitroaniline, 4-phenylsulphonyl-2-nitroaniline, 2-, 3- or 4-amino-benzaldehyde, 2-, 3- or 4-aminodiphenyl ether, 2-amino-4-chlorodiphenyl ether, 4,4'-dichlorodiphenyl ether, 2-, 3- or 4-amino-$\beta$-dimethylaminoacetophenone, 2-, 3- or 4-amino-$\beta$-diethylaminoacetophenone, 2-, 3- or 4-aminoacetophenone, 4-amino-n-butyrophenone, 4-amino-n-caprophenone, 2-amino-5-nitro-acetophenone, 2-, 3- or 4-aminobenzophenone, 2-, 3- or 4-amino-4'-methyl-, -4'-isopropyl-, -4'-n-butyl- or -4'-n-hexyl-benzophenone, 2-, 3- or 4-amino-2',4'-dimethylbenzophenone, 2-, 3- or 4-amino-4'-methoxybenzophenone, 4-amino-5-nitrobenzophenone, 2-, 3- or 4-aminobenzoic acid methyl or ethyl ester, 2-, 3- or 4-aminobenzoic acid n-butyl ester, 2-, 3- or 4-aminobenzoic acid n-decyl ester, 1-aminobenzene-3,5-dicarboxylic acid dimethyl or diethyl ester, 2-, 3- or 4-aminobenzoic acid phenyl ester, 2-, 3- or 4-aminobenzoic acid 4'-tert.-butyl or 4'-isohexylphenyl ester, 2-, 3- or 4-aminobenzoic acid cyclohexyl ester, benzyl ester, $\beta$-methoxyethyl ester, $\beta$-ethoxyethyl ester, $\beta$-butoxyethyl ester, methyldiglycol ester, ethyldiglycol ester, methyltriglycol ester, ethyltriglycol ester, $\beta$-hydroxyethyl ester, $\beta$-acetoxyethyl ester, $\beta$-($\beta'$-hydroxyethoxy)-ethyl ester, $\beta$-hydroxypropyl ester, $\gamma$-hydroxypropyl ester, $\delta$-hydroxybutyl ester or $\omega$-hydroxyhexyl ester, 4-nitroanthranilic acid methyl ester, isobutyl ester, methyldiglycol ester, $\beta$-methoxyethyl ester, $\beta$-butoxyethyl ester or methyldiglycol ester, 2-, 3- or 4-aminobenzamide, 2-, 3- or 4-aminobenzoic acid monomethylamide, 2-, 3- or 4-aminobenzoic acid dimethylamide, 2-, 3- or 4-aminobenzoic acid ethyleneimide, 2-, 3- or 4-aminobenzoic acid isopropylamide, 2-, 3- or 4-aminobenzoic acid diethylamide, 2-, 3- or 4-aminobenzoic acid di-n-butylamide, 2-, 3- or 4-aminobenzoic acid morpholide, 2-, 3- or 4-aminobenzoic acid anilide, 2-, 3- or 4-aminobenzoic acid N-methylanilide, 2-, 3- or 4-aminobenzoic acid N,N-dimethylhydrazide, 2-, 3- or 4-aminobenzoic acid ($\gamma$-dimethylaminopropylamide), 2-, 3- or 4-aminophenylbenzoic acid esters, 2-, 3- or 4-aminophenyl-4'-tert.-butylbenzoic acid esters, 2-, 3- or 4-aminophenyl-2',4',6'-trimethylbenzoic acid esters, 2-, 3- or 4-aminophenylmethylsulphonic acid esters, 2-, 3- or 4-aminophenylethylsulphonic acid esters, 2-, 3- or 4-aminophenyl-$\beta$-chloroethylsulphonic acid esters, 2-, 3- or 4-aminophenylbutylsulphonic acid esters, 2-, 3- or 4-aminophenyl-n-hexylsulphonic acid esters, 2-, 3- or 4-aminophenylphenylsulphonic acid esters, 2-, 3- or 4-aminophenyl-(4'-methylphenyl)-sulphonic acid esters, 2-, 3- or 4-aminophenyl-(4'-n-butylphenyl)-sulphonic acid esters, 2-, 3- or 4-aminophenyl-(4'-methoxyphenyl)-sulphonic acid esters, 2-, 3- or 4-aminobenzenesulphonic acid phenyl ester, 2-, 3- or 4-aminobenzenesulphonic acid 4'-n-butylphenyl ester, 2-, 3- or 4-aminophenyl-$\beta$-ethoxyethylsulphamic acid esters, 2-, 3- or 4-aminophenyldimethylsulphamic acid esters, 2-, 3- or 4-aminophenylethylsulphamic acid esters, 2-, 3- or 4-aminophenyldiethylsulphamic acid esters, 2-, 3- or 4-aminophenyl-di-n-butylsulphamic acid esters, 2-, 3- or 4-aminophenylcyclohexylsulphamic acid esters, 4-aminophenyl methyl sulphone, 4-aminodiphenyl sulphone, 2-, 3- or 4-aminobenzenesulphonamide, 2-, 3- or 4-aminobenzenesulphonic acid monomethylamide, 2-, 3- or 4-aminobenzenesulphonic acid dimethylamide, 2-, 3- or 4-aminobenzenesulphonic acid dimethylamide, 2-, 3- or 4-aminobenzenesulphonic acid ethyleneimide, 2-, 3- or 4-aminobenzenesulphonic acid diethylamide, 2-, 3- or 4-aminobenzenesulphonic acid di-n-butylamide, 2-, 3- or 4-aminobenzenesulphonic acid morpholide, 2-, 3- or 4-aminobenzenesulphonic acid cyclohexylamide, 2-, 3- or 4-aminobenzenesulphonic acid anilide, 2-, 3- or 4-aminobenzenesulphonic acid N-methylanilide, 1-methyl-2-aminobenzene-4-sulphonamide, 1-methyl-2-aminobenzene-4-sulphonic acid n-hexylamide, 1-methoxy-2-aminobenzene-4-sulphonamide, 1-methoxy-2-aminobenzene-4-sulphonic acid diethylamide, 1-methoxy-2-aminobenzene-4-sulphonic acid di-n-butylamide, 1- methoxy-2-aminobenzene-4-sulphonic acid N-methylanilide, 1-chloro-2-aminobenzene-4-sulphonic acid dimethylamide, 1-chloro-2-aminobenzene-5-sulphonic acid β-ethoxyethylamide, 1-chloro-3-aminobenzene-4-sulphonamide, 1-chloro-4-aminobenzene-2-sulphonic acid dimethylamide, 4-aminobenzenephenylurethane, 2-, 3- or 4-aminoacetanilide, 2-, 3- or 4-aminophenoxyacetanilide, 2-, 3- or 4-amino-N-methylacetanide, 4-aminoazobenzene, 4-amino-4'-hydroxyazobenzene, 2',3-dimethyl-4-aminoazobenzene, 2,5-dimethyl-4-aminoazobenzene, 2-methyl-5-methoxy-4-aminoazobenzene, 4'-nitro-2,5-dimethoxy-4-aminoazobenzene, 4'-nitro-2-methyl-5-methoxy-4-aminoazobenzene, 2-aminothiazole, 2-amino-5-methylsulphonylthiazole, 2-amino-5-nitrothiazole, 2-amino-4-methyl-5-nitrothiazole, 2-cyano-3-amino-4-methylisothiazole, 2-amino-6-nitrobenzthiazole, 2-amino-5-phenyl-1,3,4-thiadiazole, 2-amino-3-nitro-4-methylthiazole, 3-phenyl-5-amino-1,2,4-thiadiazole, 4-aminobenz-1,2,3-triazole, 2-amino-4-methylthio-1,3,5-thiadiazole, 3-amino-5-nitro-2,1-benzisothiazole, 3-amino-5-nitro-7-chloro-2,1-benzisothiazole, 3-amino-7-nitro-2,1-benzisothiazole, 4-amino-7-nitro-1,2-benzisothiazole, 4-amino-1,2-benzisothiazole, 3-amino-5-nitro-1,2-benzisothiazole, 2-aminothiophen, 3-cyano-2-aminothiophen, 3-nitro-2-aminothiophen, 3,5-dicyano-2-aminothiophen, 3,5-dinitro-2-aminothiophen, 3-cyano-5-nitro-2-aminothiophen, 2-amino-5-methylsulphonyl-1,3,4-thiadiazole, 2-amino-3-nitro-4-methylthiazole, 2-amino-4-methylsulphonyl-1,3,5-thiadiazole, 4-amino-5-cyano-7-nitro-1,2-benzisothiazole, 2-amino-4,5-dicyanoimidazole and 2-amino-1-methyl-4,5-dicyanoimidazole.

Examples of coupling components of the general formula VIII which are very suitable for the preparation of dyestuffs according to the invention, can be seen in Table 1 which follows.

TABLE 1

(VIII)

$$\text{Structure with } R^2, R^1 \text{ on one phenyl, } R^3 \text{ on other phenyl, N linking with A-O-B}$$

| $R^1$ | $R^2$ | $R^3$ | A | B |
|---|---|---|---|---|
| $CH_3$ | H | $OCH_3$ | $-CH_2-CH_2-$ | $-CH_2-CH_2-OH$ |
| $CH_3$ | $CH_3$ | H | $-CH_2-CH_2-$ | $-CH_2-CH_2-O-C_4H_9(n)$ |
| Cl | H | H | $-(CH_2)_3-$ | H |
| H | $CH_3$ | $OCH_3$ | $-(CH_2)_3-$ | $-(CH_2-CH_2-O-)_2C_2H_5$ |
| H | H | H | $-CH_2-CH_2-$ | $-(CH_2-CH_2-O)_2-OCO-C_4H_9$ |
| H | $CH_3$ | H | $-(CH_2)_6-$ | $-CH_2-CH_2-O-CO-CH_3$ |
| H | Cl | H | $-(CH_2)_4-$ | $-(CH_2-CH_2-O-)_3-CH_3$ |
| $CH_3$ | H | H | $-CH_2-CH_2-$ | $-(CH_2CH_2O)_6-COC_2H_5$ |
| H | H | $OC_4H_9$ | $-CH_2-$ | $-CH_2-CH_2-CH_2-O-H$ |
| H | H | H | $-CH_2-CH(CH_3)-$ | $-CH_2CH_2-OC_4H_9(iso)$ |
| $CH_3$ | H | H | $-CH(C_2H_5)-CH(C_2H_5)-$ | $-CH(CH_3)-CH_2OH$ |
| H | $CH_3$ | H | $-(CH_2)_3-CH(C_2H_5)-$ | $-CH_2CH_2OH$ |
| $CH_3$ | $CH_3$ | H | $-CH(CH_3)(CH_2)_2-CH(CH_3)-$ | $-(CH_2CH_2O)_2H$ |
| H | H | $OCH_3$ | $-CH_2-CH(C_4H_9)-$ | $-(CH_2CH_2O)_2COCH_3$ |
| $CH_3$ | H | $OCH_3$ | $-(CH_2)_2-CH(CH_3)-(CH_2)_2-$ | $-CH_3$ |
| H | $CH_3$ | $OCH_3$ | $-(CH_2)_2-CH(C_2H_5)-$ | $-CH_2CH_2OH$ |

The preparation of the dyestuffs according to the invention in which D is a phenyl nucleus substituted by several electron-attracting groups, by diazotising suitably substituted amines and subsequent coupling, can give rise to technical difficulties, since the corresponding amines are difficult of access or the diazonium compounds formed from them have a tendency to undergo side reactions.

Examples of dyestuffs, according to the invention, of this type are those in which D is a group of the formula

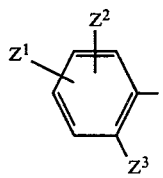

wherein $Z^1$ and $Z^2$ are identical or different substituents belonging to the group comprising Cl, Br, NO$_2$, CN, —SO$_2$—R$^5$ or OR$^5$ and Z$^3$ denotes —NO$_2$, —CN or —SO$_2$-alkyl. These dyestuffs can with advantage be prepared by subjecting dyestuffs, according to the invention, in which D is a group of the formula

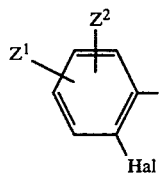

wherein $Z^1$ and $Z^2$ have the above meanings and Hal denotes a halogen atom, particularly chlorine or bromine, to a nucleophilic exchange reaction in accordance with the instructions of German Offenlegungsschrift Nos. 1,809,920 or 1,809,921 or British Pat. No. 1,184,825, the nucleophilic agent employed being the nitrite ion NO$_2^\ominus$ for dyestuffs in which Z$^3$=—NO$_2$, the cyanide ion CN$^\ominus$ for dyestuffs in which Z$^3$=—CN, and the alkylsulphinate ion alkyl-SO$_2^\ominus$ for dyestuffs in which Z$^3$=—SO$_2$—R$^5$.

The exchange reactions are carried out in an inert organic solvent, preferably a dipolar, aprotic solvent, such as, for example, N-methylpyrrolidone, pyridine, dimethylformamide or dimethyl sulphoxide. The reaction temperatures are normally between 20° and 150° C. The nucleophilic agent (NO$_2^\ominus$, CN$^\ominus$ and R$^5$SO$_2^\ominus$) is introduced into the reaction in the form of a metal salt (for example NaNO$_2$, Zn(SO$_2$R$^5$)$_2$ or NaCN), but is preferably introduced in the form of a copper-I compound or in the presence of another copper-I compound, such as, for example, CuCl, CuBr, CuI or Cu$_2$O.

The diazo components of the formula VII required for the preparation of the dyestuffs according to the invention are well-established commercial products, while the coupling components of the formula VIII can be prepared by various processes which are in themselves known.

For example, diphenylamine derivatives of the formula

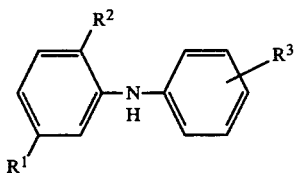

wherein R$^1$, R$^2$ and R$^3$ have the meanings indicated above, can be reacted in accordance with the instructions in German Offenlegungsschrift No. 2,228,350, with compounds of the formula Hal—A—O—B wherein Hal is chlorine or bromine and A and B also have the meanings indicated above, to give coupling components of the formula VIII.

Another possible means, which is in itself known, of preparing the coupling components required consists in reacting aniline derivatives with phenol or halogenobenzene derivatives in accordance with the equation

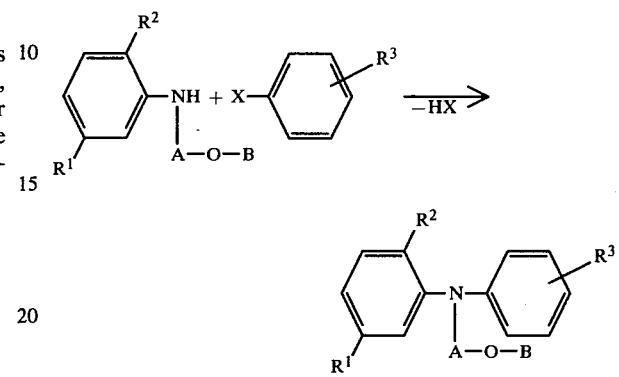

wherein R$^1$, R$^2$, R$^3$, A and B have the meanings mentioned above and X is chlorine or bromine or OH.

The reaction is carried out in accordance with the instructions in the literature, as a rule in the presence of inert organic solvents, such as, for example, halogenobenzenes, higher alkanols or polyglycol derivatives, dimethylformamide and the like, but can also be carried out in the melt. Additives which promote the removal of HX, such as acid acceptors, copper and copper salts or agents which split off water, can facilitate the reaction.

The dyestuffs according to the invention are particularly suitable for dyeing and printing hydrophobic fibre materials, such as, for example, polyolefines, polyvinyl compounds, polyamide, polyacrylonitrile, cellulose 2½-acetate, cellulose triacetate and, particularly, polyester materials, for example polyethylene glycol terephthalate. On these materials they produce, using customary dyeing and printing processes, deep brilliant orange to navy blue dyeings and prints which have very good fastness properties, particularly very good fastness to light, dry heat pleating, dry heat fixing and koratrone treatment, while having very good thermal migration properties.

The dyeing of the said fibres, which can be present on their own or as a mixture with other types of fibres, such as, for example, cotton, regenerated cellulose fibres or wool, with the dyestuffs according to the invention is appropriately effected from an aqueous suspension, in the presence of carriers at between about 80° and 100° C., in the absence of carriers at between about 110° and 140° C. and using the so-called thermofixing process at about 180°–230° C. The printing of the said materials can be carried out by a process in which the goods which have been printed with the new dyestuffs are steamed in the presence of a carrier at temperatures between about 100° and 110° C., or, in the absence of a carrier, at about 110°–180° C., or are treated by the so-called thermofixing process at about 180°–230° C.

The dyestuffs according to the invention are also suitable for dyeing the hydrophobic materials listed above from organic solvents and for mass coloration.

Dyestuffs of the general formula IX

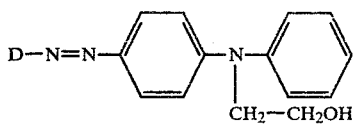

in which D denotes phenyl, 5-nitrothiazol-2-yl or 3,5-dinitrothienyl, each of which is optionally substituted by up to three substituents belonging to the group comprising $NO_2$, F, Cl, Br, $CF_3$ or CN, are of particular industrial interest.

Dyestuffs of the formula IX in which D denotes optionally substituted phenyl, are excellently suitable for the printing and dyeing processes indicated above. Dyestuffs having diazo components which can be split by means of alkali, such as, for example, dyestuffs of the formula IX in which D is a nitrothiazole or dinitrothiophen radical are, in addition, particularly suitable for the production of discharge resist prints and reserve effects using alkaline discharging agents, such as are described, for example, in German Offenlegungsschriften Nos. 2,836,391 and 2,856,283.

EXAMPLE 1

(a) 13.8 parts of 4-nitroaniline in 150 parts of glacial acetic acid are diazotised with 32.6 parts of 42% strength nitrosylsulphuric acid with external cooling at +15° C. The clear diazo solution is then run into a solution of 22.0 parts of N-β-hydroxyethyldiphenylamine in a mixture of 200 parts of isobutanol and 40 parts of water, in 30 minutes. The reaction temperature is kept at 0° to +5° C. during coupling by means of external cooling. The resulting dyestuff of the following formula

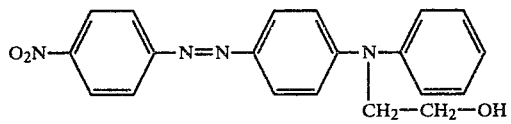

is precipitated by adding 5,000 parts of water, filtered off and washed with water and dried.

(b) 1.0 part by weight of the finely divided dyestuff obtained in accordance with 1a are stirred into 2,000 parts by weight of water. The pH of the mixture is adjusted to a value of 5–6 with acetic acid and 4.0 parts by weight of ammonium sulphate and 2.0 parts by weight of a commercial dispersing agent based on a naphthalenesulphonic acid/formaldehyde condensation product are added.

100 parts by weight of a polyester fabric based on polyethylene glycol terephthalate are introduced into the dye liquor obtained in this way and dyeing is carried out for 1½ hours at 130° C. Subsequent rinsing, reductive after-treatment with a 0.2% strength alkaline solution of sodium dithionite for 15 minutes at 70°–80° C., rinsing and drying gives a deep scarlet dyeing which has very good coloristic properties, particularly very good fastness to light and dry heat pleating and dry heat fixing and good thermal migration properties.

EXAMPLE 2

(a) 16.3 parts by weight of 2-cyano-4-nitroaniline are diazotised as described in Example 1a and coupled with 22 parts of N-β-hydroxyethyldiphenylamine and the product is isolated.

(b) 30.0 parts by weight of the dyestuff obtained in accordance with Example 2a of the formula

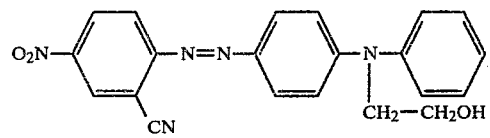

are incorporated, in a finely divided state, into a printing paste containing, per 1,000 parts by weight, 45.0 parts by weight of locust bean flour, 6.0 parts by weight of sodium 3-nitrobenzenesulphonate and 3.0 parts by weight of citric acid. After printing, drying and fixing in a thermofixing frame for 45 seconds at 215° C., rinsing and finishing as described in Example 1b, paragraph 2, this printing paste produces, on a polyester fabric, a deep, ruby-coloured print having very good coloristic properties, particularly very good fastness to light and dry heat pleating and dry heat fixing. If the dyestuff is employed in the form of the above printing paste for printing triacetate fabric and if the printed fabric, after drying, is steamed for 10 minutes at 1.5 atmospheres gauge, rinsed, soaped, rinsed again and dried, the dyestuff produces a ruby-coloured print having very good coloristic properties.

EXAMPLE 3

(a) 24.2 parts by weight of 2-cyano-4-nitro-6-bromoaniline are diazotised as described in Example 1a and the product is added in the course of 30 minutes at 0°–5° C., with external cooling, to a solution of 22 parts of N-β-hydroxyethyldiphenylamine in 500 parts of 40% strength sulphuric acid. The dyestuff formed is filtered of, washed with water until it is neutral and dried.

(b) A fabric made of polyethylene glycol terephthalate is padded at 30° C. on a padder with a liquor containing 30 parts by weight of the dyestuff of the formula

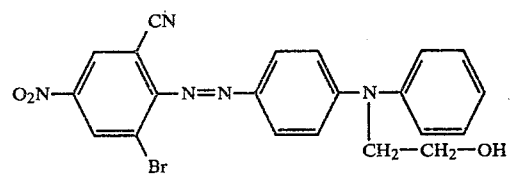

which has been obtained in accordance with Example 3a and has been brought into a finely divided state, 1.0 part by weight of polyacrylamide with a K-value of 120 and 0.5 part by weight of a polyglycol ether of oleyl alcohol and 968.5 parts by weight of water. After drying, the goods are fixed for 60 seconds at 215° C. in a thermofixing frame. Subsequent rinsing and finishing as described in Example 1b, paragraph 2, gives a bluish-tinged violet dyeing having very good fastness properties, particularly very good fastness to light.

EXAMPLE 4

(a) 17.3 parts by weight of 2-chloro-4-nitroaniline are diazotised as indicated in Example 1a and coupled with N-β-hydroxyethyldiphenylamine and the resulting dyestuff is isolated.

(b) 100 parts by weight of polyester material are treated for 30 minutes at 121° C. in 1,500 parts by weight of tetrachloroethylene in which 2.0 parts by weight of the dyestuff described in Example 4a have been dissolved. The goods are rinsed with warm and cold tetrachloroethylene and a strong, red dyeing which has very good coloristic properties is obtained. Red dyeings having very good coloristic properties are also obtained if, in the above example, the polyester material is replaced by 100 parts by weight of triacetate material or 2½-acetate material and if dyeing is carried out for 45 minutes at 110° C. or 45 minutes at 80° C., respectively.

EXAMPLE 5

(a) 18.3 parts of 2,4-dinitroaniline are diazotised as described in Example 1a and coupled with N-β-hydroxyethyldiphenylamine and the product is isolated. This gives the dyestuff of the formula

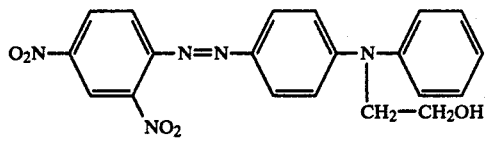

(b) Under the conditions of the printing instructions stated in Example 2b, 30.0 parts by weight of the dyestuff described in Example 5a, which has been brought into a finely divided state, produce a ruby-coloured print having very good coloristic properties, particularly very good fastness to light and to thermofixing.

EXAMPLE 6

(a) 29.6 parts of 2,6-dibromo-4-nitroaniline are diazotised as described in Example 3a and coupled with N-β-hydroxyethyldiphenylamine and the product is isolated.

(b) If the procedure indicated in Example 5b is followed, using the resulting dyestuff of the formula

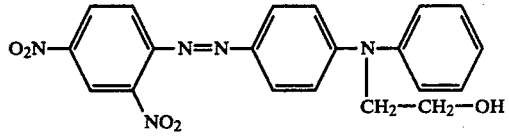

a strong brown print having very good coloristic properties, particularly good fastness to thermofixing and thermal migration, is obtained.

EXAMPLE 7

(a) If the dyestuff obtained in accordance with Example 6a is reacted with copper cyanide in N-methylpyrrolidone in accordance with the teaching of U.S. Pat. No. 3,962,209, Example 1, the dyestuff of the following formula

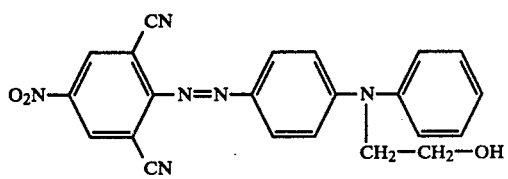

is isolated and this enables polyester to be dyed and printed in strong blue shades which have good fastness properties.

EXAMPLE 8

(a) A solution of 0.2 mol of diazotised 2-amino-5-nitrothiazole in a mixture of sulphuric acid, acetic acid and propionic acid (obtained in accordance with the instructions of Example 1 of German Auslegeschrift No. 1,019,415) is added, in the course of 10 minutes and at 0° to +5° C., to a solution of 42.6 parts of N-β-hydroxyethyldiphenylamine in 320 parts of isobutanol. After stirring for a further 2 hours, the product is precipitated in 3,000 parts of ice-water and the dyestuff is filtered off, washed until neutral and dried.

(b) 30 parts of the dyestuff of the formula

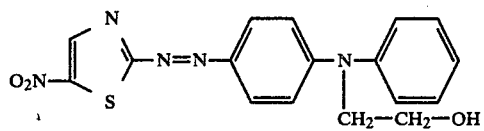

are added, in a finely divided state, to a padding liquor containing, per 1,000 parts, 937 parts of water, 3 parts of monosodium phosphate, 10 parts of sodium chlorate and 20 parts of a polymerisation product based on acrylic acid as an antimigration agent. After drying, after-printing is carried out with a printing paste containing, per 1,000 parts, 600 parts of an aqueous 10% strength locust bean flour ether thickener, 120 parts of water, 80 parts of sodium carbonate, 100 parts of polyethylene glycol 400 and 100 parts of glycerol. Fixing with superheated steam for 7 minutes at 175° C., reductive after-treatment, soaping and subsequent rinsing and drying gives a navy blue print which has very good fastness properties, above all good fastness to light, dry heat fixing, rubbing and washing. A very good white ground with sharp outlines is obtained at the places on which the printing paste containing sodium carbonate is printed.

EXAMPLE 9

Instead of 30 parts of the dyestuff of Example 8, 20 parts of the dyestuff of the formula

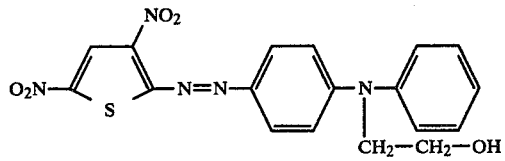

are used and the procedure followed in other respects is as indicated in Example 1. This gives a blue print which has very good coloristic properties, particularly good fastness to light, dry heat fixing, rubbing and washing and a very good white ground with sharp outlines is obtained at the discharged areas.

Further dyestuffs according to the invention which produce deep, scarlet to blue dyeings or prints also having very good coloristic properties, on polyester materials, are shown in Table 2 below:

TABLE 2
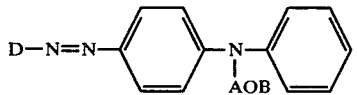
| No. | D | AOB | Shade |
|---|---|---|---|
| 1 | 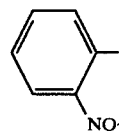 | —CH₂—CH₂—O—CH₂—CH₂OH | scarlet |
| 2 | 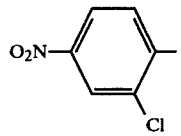 | —CH₂—CH₂—O—CO—CH₃ | red |
| 3 | 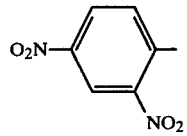 | —CH₂—CH₂—CH—CH₂<br>         \|       \|<br>        OH   OH | ruby |
| 4 | 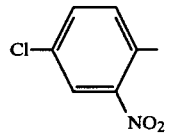 | —(CH₂)₃—OH | red |
| 5 | 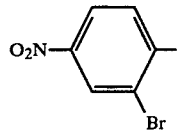 | —(CH₂)₄—OH | red |
| 6 | 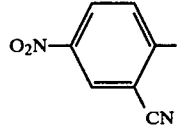 | —(CH₂—CH₂—O)₂—CH₂—CH₂—OH | ruby |
| 7 | 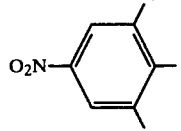 | —CH₂—CH₂—OH | brown |
| 8 | 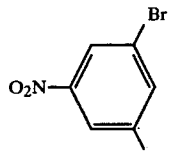 | —CH₂—CH₂—OH | brown |
| 9 | 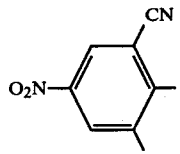 | —CH₂—CH₂—OH | bluish-tinged violet |

TABLE 2-continued

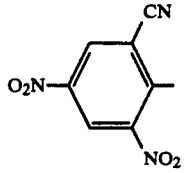

| No. | D | AOB | Shade |
|---|---|---|---|
| 10 | 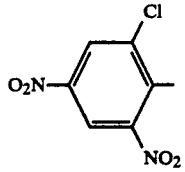 2-CN, 4-$O_2N$, 6-$NO_2$ phenyl | —$CH_2$—$CH_2$—OH | blue |
| 11 | 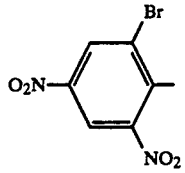 2-Cl, 4-$O_2N$, 6-$NO_2$ phenyl | —$CH_2$—$CH_2$—OH | bluish-tinged violet |
| 12 | 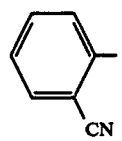 2-Br, 4-$O_2N$, 6-$NO_2$ phenyl | —$CH_2$—$CH_2$—O$CH_2$—$CH_2$—O$CH_3$ | bluish-tinged violet |
| 13 | 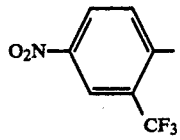 2-CN phenyl | —$CH_2$—$CH_2$—OH | scarlet |
| 14 | 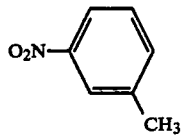 4-$O_2N$, 2-$CF_3$ phenyl | —$CH_2$—$CH_2$—OH | red |
| 15 | 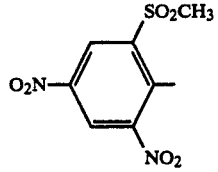 4-$O_2N$, 2-$CH_3$ phenyl | —$CH_2$—$CH_2$—OH | scarlet |
| 16 | 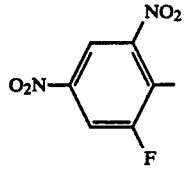 2-$SO_2CH_3$, 4-$O_2N$, 6-$NO_2$ phenyl | —$CH_2$—$CH_2$—OH | blue |
| 17 | 2-$NO_2$, 4-$O_2N$, 6-F phenyl | —$CH_2$—$CH_2$—OH | violet |
| 18 | 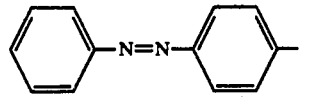 phenyl-N=N-phenyl | —$CH_2$—$CH_2$—OH | scarlet |

TABLE 2-continued

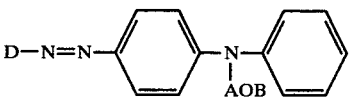

| No. | D | AOB | Shade |
|---|---|---|---|
| 19 | 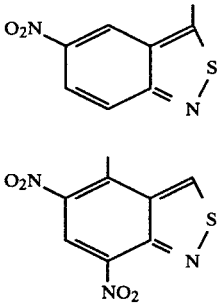 | —CH₂—CH₂—OH | blue |
| 20 | 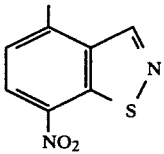 | —CH₂—CH₂—OH | ruby |
| 21 | 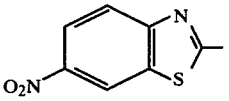 | —CH₂—CH₂—OH | red |
| 22 | 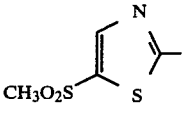 | —CH₂—CH₂—CH₂—OH<br>          \|<br>          OH | red |
| 23 | 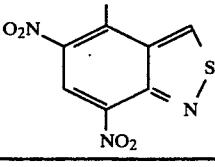 | —CH₂—CH₂—OH | blue |
| 24 | 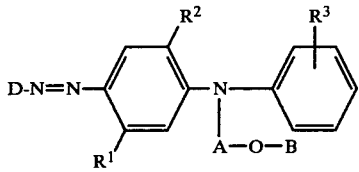 | —CH₂—CH₂—OH | blue |

What is claimed is:

1. Water-insoluble azo dyestuffs of the formula

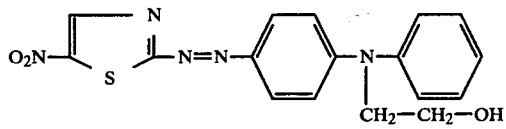

wherein
  D is a thiophene or thiazo moiety which is unsubstituted or substituted by —NO₂;
  A is an alkylene chain having 2 to 6 carbon atoms which is unsubstituted or substituted by hydroxyl;
  B is hydrogen, alkyl having 1 to 4 carbon atoms, hydroxyalkyl having 2 to 4 carbon atoms, $C_1$ to $C_4$ alkoxy- or $C_1$ to $C_4$ alkanoyloxyalkyl having 3 to 8 carbon atoms, hydroxypolyoxyalkylene having 4 to 12 carbon atoms, $C_1$ to $C_4$ alkoxy- or $C_1$ to $C_4$ alkanoyloxypolyalkylene having 5 to 16 carbon atoms, alkanoyl having 2 to 6 carbon atoms or benzoyl;
  $R^1$ is hydrogen, methyl and chloro;
  $R^2$ is hydrogen, halogen, alkyl having 1 to 4 carbon atoms or alkoxy having 1 to 4 carbon atoms, and
  $R^3$ is hydrogen and alkoxy having 1 to 8 carbon atoms.

2. Water-insoluble azo dyestuffs according to claim 1 wherein $R^1$, $R^2$ and $R^3$ are hydrogen.

3. Water-insoluble azo dyestuffs according to claim 1 wherein AOB is the β-hydroxyethyl moiety.

4. Water-insoluble azo dyestuffs according to claim 2 wherein AOB is the β-hydroxyethyl moiety.

5. Water-insoluble dyestuff of the formula

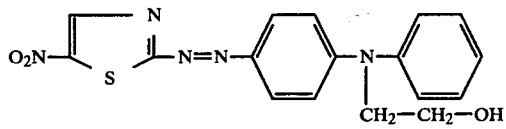

6. Water-insoluble dyestuff of the formula

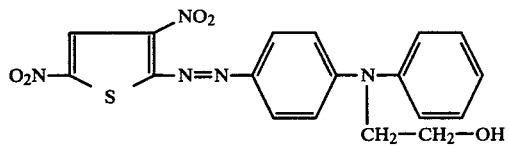

7. The process for manufacture of water-insoluble azo dyestuffs of claim 1 comprising diazotizing an amine which is free from ionic groups and having the formula

and coupling the diazotized amine with a diphenylamine of the formula

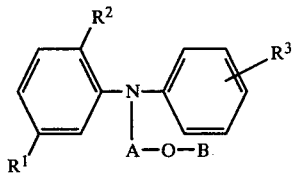

8. The process according to claim 7 wherein either said diazotized amine or said diphenylamine is a mixture of at least two species of the respective formulas.

* * * * *